July 17, 1956  J. G. SENNER  2,754,619
ANIMAL TRAPS
Filed June 15, 1955

INVENTOR
JONAS SENNER
BY
ATTORNEY

United States Patent Office 2,754,619
Patented July 17, 1956

2,754,619

ANIMAL TRAPS

Jonas G. Senner, Selah, Wash.

Application June 15, 1955, Serial No. 515,665

8 Claims. (Cl. 43—86)

This invention relates to animal traps.

A primary object of the invention is to provide a simplified and inexpensive, yet highly effective and sensitive trap for small animals such as mice, rats, and other rodents.

Another object of the invention is to provide a trap of the above-mentioned character which will kill the animal instantly when sprung by choking the animal or breaking its neck.

Another object is to provide a trap which is extremely easy to set without endangering the hands or fingers of the user, and which is extremely delicately balanced or sensitive so as to be sprung instantly when the weight of the animal engages a movable platform part of the trap.

Another object is to provide a trap which may be readily disassembled when necessary, and which has means for adjusting the delicate balance of the operating parts of the trap.

Other objects and advantages of the invention will be apparent during the course of the following description.

Figure 1:
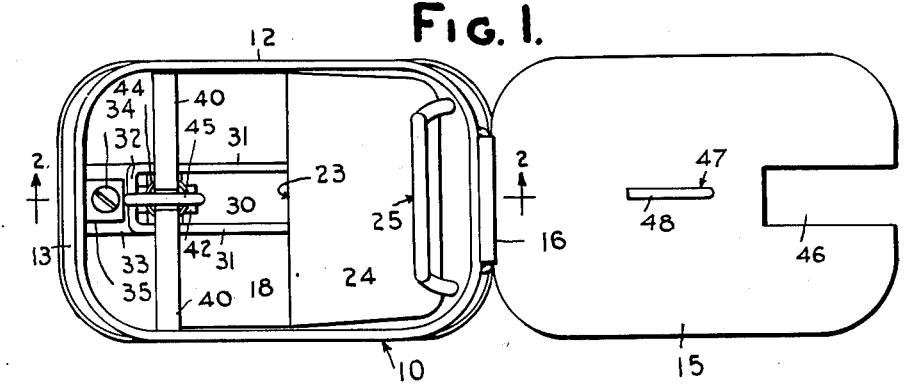
Figure 2:
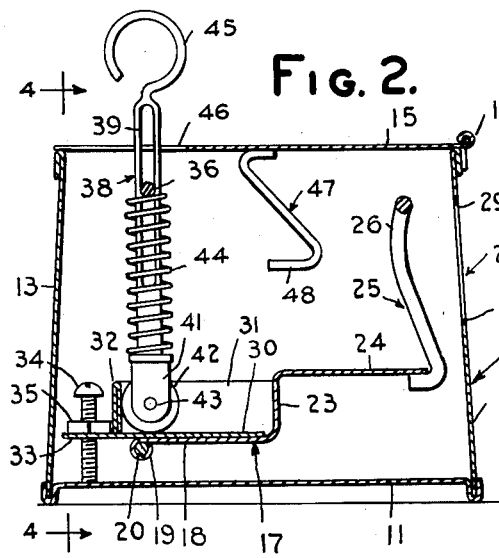
Figure 3:
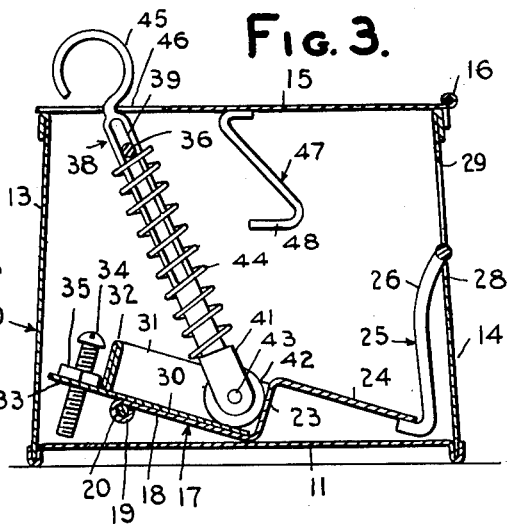
Figure 4:
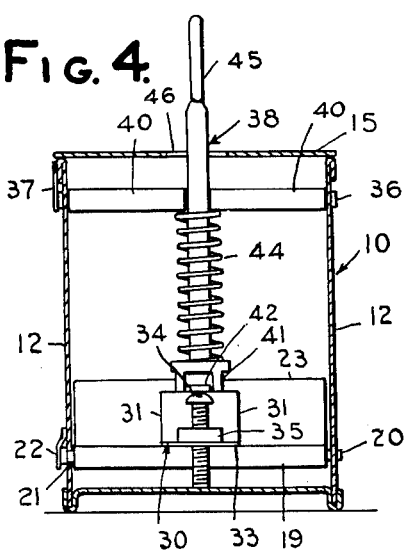
Figure 5:
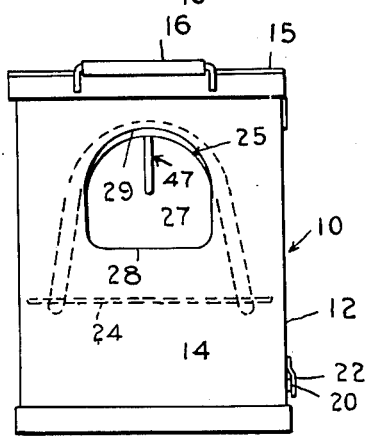

In the accompanying drawings, forming a part of this application, and in which like numerals are employed to designate like parts throughout the same, Figure 1 is a plan view of the trap in its set position and with its top open, for the purpose of illustration, Figure 2 is a central vertical section taken on line 2—2 of Figure 1 with the top or cover of the trap in closed position, Figure 3 is a section similar to Figure 2 showing the trap in the released or sprung position, Figure 4 is a transverse vertical section taken on line 4—4 of Figure 2, with parts in elevation, and, Figure 5 is an end elevation of the trap in its set position.

In the drawings, where for the purpose of illustration is shown a preferred embodiment of the invention, the numeral 10 designates generally a body portion or casing for the trap which may be formed of sheet metal, plastics material, or the like. The casing 10 is preferably generally rectangular in horizontal cross section and includes a bottom wall 11, upstanding side walls 12 and end walls 13 and 14, rigidly secured together in any preferred manner to provide a box-like construction for the casing 10. The top of the casing 10 is open, and a flat top or cover plate 15 is provided for the open top of the casing, hingedly secured thereto at 16, adjacent the forward end wall 14.

A generally horizontal platform 17 is arranged within the casing 10 near and above the bottom wall 11 for vertical swinging movement about its rear end. This platform 17 extends for substantially the full width of the casing between its side walls 12 and throughout a major portion of its length. The platform 17 comprises a rear relatively low horizontal portion 18, provided at its rear end with a depending transverse hinge knuckle 19, integral therewith. The hinge knuckle 19 receives a horizontal transverse pin 20 which extends between the side walls 12, near and above the bottom wall 11 and somewhat forwardly of the rear end wall 13. The ends of the pin 20 engage within apertures 21 formed in the side walls 12, Figure 4, and the pin 20 serves to pivotally support the rear end of the platform 17, so that its forward end may be elevated and lowered about the axis of the pin 20. The pin 20 is readily removable from the openings 21 and hinge knuckle 19 when this is necessary, and a small tab 22 carried by one side wall 12 engages over the headed end of the pin 20 to prevent accidental endwise displacement of the pin from the hinge knuckle 19. The tab 22 is readily bendable to permit removal of the pin for repairing or disassembling the trap.

The platform 17 further comprises a relatively low upstanding vertical portion or wall 23 at the forward end of the platform portion 18 and preferably integral therewith and projecting above the horizontal portion 18. Forwardly of the vertical wall 23, the platform 17 further comprises a relatively high or stepped up forward horizontal portion 24, preferably integrally secured to the top of the vertical wall portion 23, and extending forwardly thereof to a point near and rearwardly of the forward wall 14.

At its forward end, the platform portion 24 has rigidly secured to it in any preferred manner a generally upright inverted U-shaped element or loop 25 formed of stiff wire or the like. The element 25 projects a substantial distance above the platform portion 24 and is preferably inclined rearwardly somewhat from its lower end and has its upper portion somewhat forwardly directed as at 26. Forwardly of the element or loop 25, the forward wall 14 of the casing 10 is provided with a relatively large opening 27 having a lower straight horizontal boundary or edge 28 and a rounded top edge 29. The opening 27 is formed near and below the top of the casing 10 and at its transverse center. When the trap is set, Figure 2, and the platform portion 24 is substantially horizontal, the upper end of the inverted U-shaped element 25 is adjacent the upper curved edge 29 of the opening 27 and spaced rearwardly thereof, Figure 2. When the trap is sprung, Figure 3, and the platform 17 swings downwardly to the inclined position shown, the top of the element of loop 25 swings directly over the straight lower edge 28 of the opening 27, Figure 3, so as to choke or strangle the animal whose head or neck is projecting into the trap through the opening 27. The inverted U-shaped loop 25 thus coacts with the lower edge 28 of the opening 27 to kill the animal when the trap is sprung, as will be more fully described hereinafter.

The lower horizontal platform portion 18 has rigidly mounted upon it at its transverse center a flat smooth longitudinal plate or track 30 which may be highly polished. Spaced parallel upstanding guide flanges or walls 31 project above the plate 30 to substantially the elevation of the platform 24 and are rigidly secured by any suitable means to the plate 30. A rear transverse vertical abutment or wall 32 connects the rear ends of the flanges 31 and is preferably formed integral therewith, as shown. The abutment 32 is spaced slightly rearwardly of the pin 20 and is arranged opposite the vertical portion 23 of the platform 17, as shown. The walls 23, 31 and 32 thus form with the plate 30 a longitudinal slot or guide way open at its top upon the platform 17.

A rear horizontal extension 33 of the plate 30 projects rearwardly of the abutment 32 and is apertured centrally to receive a vertical adjusting screw 34, having screw-threaded engagement within a nut 35, soldered, welded or otherwise rigidly secured to the top of the extension 33, just rearwardly of the abutment 32 and near the rear wall 13. The lower end of the adjusting screw 34 contacts the bottom wall 11 to limit the upward swinging movement of the forward end of the platform 17. The sensitivity of the trap is adjusted or controlled by means of this screw 34.

The side walls 12 of the casing are apertured near and below their upper ends and just slightly forwardly of the pin 20 to receive an upper transverse horizontal pin 36, which extends between the side walls 12 and is supported thereby, as shown. The headed end of this pin 36 is engaged by a bendable tab 37 on one side wall 12 near the top of the casing to prevent accidental endwise displacement of the pin 36. The tap 37 may be bent up to permit removal of the pin 36 when necessary.

A generally vertical actuator rod 38 is provided, within the casing 10 and above the platform 17 and track plate 30. This rod has a longitudinal slot 39 formed therethrough and extending throughout the major portion of its length, and slidably receiving the pin 36. A pair of spacer sleeves 40 are mounted upon the pin 36 on opposite sides of the rod 38, Figure 4, to maintain the rod 38 centered within the casing 10. The lower end of the rod 38 has rigidly secured to it a bifurcated extension or yoke 41, disposed between the guide flanges 31 and substantially slidably contacting the same. A cylindrical roller 42, such as a ball bearing is journalled at 43 within the yoke 41, and this roller contacts the track plate 30 to roll thereupon between the abutment 32 and vertical platform portion 23. The flanges 31 maintain the lower end of the rod 38 centered, and also guide the yoke 41 during its movement longitudinally of the slot afforded by the flanges 31, plate 30 and walls 23 and 32.

A strong expansible coil spring 44 loosely surrounds the rod 38 and has its ends engaging the spacers 40 and the top of the yoke 41, as shown. This spring 44 furnishes the power to spring the trap and to cause the platform 17 to shift to its position shown in Figure 3 for killing the animal. The slotted rod 38 when in the vertical or trap setting position, Figure 2, projects above the cover plate 15 for a considerable distance, and the rod 38 is provided at its upper end with a ring 45 or handle to be used for setting the trap. The cover plate 15 is provided in its rear end and at its transverse center with an opening or slot 46 to allow the passage of the loop or ring 45 therethrough. When the trap is sprung, the ring 45 descends to a position immediately above the closed cover plate 15 as shown in Figure 3.

A suitable bait holding hook 47 of wire or the like is dependingly rigidly secured to the bottom of the cover plate 15 at its transverse center, and rearwardly of the inverted U-shaped loop 25. The lower bait holding extremity 48 of the hook 47 is disposed below the upper end of the loop 25 when the trap is set, Figure 2, so that the animal must thrust his head and neck through loop 25 to get at the bait.

In operation, when the trap is set, Figure 2, the mouse or other small animal will enter the trap through the opening 27 and through the loop 25 to reach the bait on the hook extremity 48. The animal will place its front feet and consequently part of its weight on the platform portion 24, and this will spring the trap and cause the platform 17 to assume its position in Figure 3. The animal will have its neck or body caught between the top of the loop 25 and the straight edge 28 of the opening 27 and be killed substantially instantly.

To set the trap, after opening the cover plate 15 to apply bait to the hook 47, and subsequently closing the cover plate, it is merely necessary to grasp the ring 45 and pull the same upwardly until the rod 38 is vertical and the roller 42 contacts the abutment 32. Since the pin 36 is very slightly forwardly of the hinge pin 29, the rod 38 and roller 42 will never move past dead center with respect to the pivot point of the platform 17. By adjusting the screw 34, a very high degree of sensitivity may be imparted to the trap, so that a very slight weight on the platform portion 24 will spring or actuate the same.

When the trap is sprung, by the weight of the animal tilting the platform downwardly, the strong spring 44 will instantly shift the rod 38 from the vertical and thrust the rod and roller 42 forwardly upon the plate 30 until the roller strikes the vertical platform portion 23. The platform will strike the bottom wall 11 if the trap is sprung without the animal thrusting its head through the opening 27.

It is to be noted that the setting of this trap does not require the operator to place his fingers within or near the opening 27, and this feature renders the trap safe or harmless to use. As previously mentioned, resetting of the trap is accomplished by merely pulling the ring 45 upwardly until the rod 38 is vertical and the adjusting screw 34 is in contact with the bottom wall 11. It is to be noted that the rod 38 has free pivotal and longitudinal sliding engagement with the pin 36, by virtue of the slotted connection. The spring 44 is preferably under some tension at all times, but under a much greater tension when the trap is set, Figure 2.

It is to be understood that the form of the invention herewith shown and described is to be taken as a preferred example of the same and that various changes in the shape, size and arrangement of parts may be resorted to, without departing from the spirit of the invention or the scope of the subjoined claims.

Having thus described my invention, I claim:

1. An animal trap comprising a casing having an upstanding wall provided with an opening, a platform pivotally mounted within the casing and shiftable from a level to an inclined position, means carried by the platform for coaction with the opening to kill an animal placing its weight upon the platform, an element having pivotal and longitudinally movable connection with the casing and movably engaging the platform and disposed vertically when the platform is in a horizontal position while the trap is set, said element being shiftable to an inclined position for thrusting the platform downwardly to its inclined position when the animal places its weight upon the platform, and resilient means connected with said element for urging it to said inclined position when the platform is tilted by the weight of the animal.

2. An animal trap comprising a casing having a wall provided with an opening, platform means pivotally mounted within the casing and shiftable from a level to an inclined position, means carried by the platform and coacting with said opening to crush an animal entering the trap through the opening and placing the weight upon the platform, and extensible spring urged means connected with the casing and movably engaging the platform and shiftable from a position perpendicular to the platform when the trap is set to a position inclined with respect to the platform when the trap is sprung by the weight of the animal upon the same.

3. An animal trap comprising a casing having an upstanding wall provided with an opening, a platform pivotally mounted within the casing and swingable from a level to a downwardly inclined position, an element secured to the platform and movable therewith relative to said opening for crushing an animal between the element and opening when the platform shifts to said downwardly inclined position, adjustable means associated with the platform to limit the upward movement of the same, means forming a track upon the platform longitudinally thereof and extending beyond one side of the platform pivot, a rod having pivotal and longitudinally shiftable connection with the casing, a roller secured to said rod and engaging said track, and a spring associated with said rod for causing the same to shift the platform from its level to its inclined position when weight is placed upon the platform, said rod being substantially vertical and substantially perpendicular to the platform when the platform is level.

4. An animal trap comprising a casing having a side wall provided with an opening, a pivoted member mounted within the casing for vertical swinging and having a part coacting with said opening to crush an animal which places weight upon the pivoted member, adjustable means to limit movement of the pivoted member in one direction, means forming a track upon the pivoted member longitudinally thereof beyond one side of the pivot of said member, a slotted member arranged within the casing and above the pivoted member and having a part movably engaging said track, an element secured to the casing and engaging the slot of said slotted member for pivotally and slidably connecting the slotted member with the casing, and a spring connected with the slotted member for urging the same into engagement with the pivoted member.

5. An animal trap comprising a casing, a pivoted member enclosed within the casing and swingable from a level to an inclined position, means carried by the pivoted member and coacting with a part of the casing for killing an animal when the pivoted member is shifted to the inclined position, adjustable means associated with the pivoted member to limit its movement in one direction, means forming a track upon the pivoted member extending beyond one side of the pivot of said member, a slotted member arranged within the casing and above the pivoted member, a roller journalled upon the slotted member and engaging said track, means on the pivoted member forming a pair of stops for the roller at the opposite ends of said track, an element carried by the casing and engaging the slot of the slotted member and serving to pivotally and slidably connect the slotted member with the casing, and a coil spring surrounding the slotted member and having one end engaging said element and serving to shift the slotted member in a direction causing the pivoted member to move to its inclined position when the animal places his weight upon the pivoted member.

6. An animal trap according to claim 4 wherein said slotted member includes a part extending outside of the casing to be grasped for shifting the slotted member and pivoted member to positions for setting the trap.

7. An animal trap according to claim 4, and means within the casing for positioning bait near said part of the pivoted member.

8. An animal trap comprising a casing having an upstanding wall provided with an opening, a tiltable platform pivotally mounted within the casing and shiftable from a substantially level to an inclined position, an element carried by the platform for coaction with said opening to kill an animal which enters the casing through the opening and places its weight upon the platform when the platform is substantially level, and a spring urged device movably connected with said casing and having one end engaging the platform and shiftable thereon toward and away from the pivot of the platform, said device being substantially normal to the platform when said end is adjacent the pivot of the platform, the device being inclined when said end moves away from the pivot of the platform, the device then causing the platform to assume its inclined position.

References Cited in the file of this patent

UNITED STATES PATENTS 876,759  Young _____ Jan. 14, 1908